Sept. 6, 1927.

H. WOCHNER

AXLE GAUGE FOR AUTOMOBILES

Filed Nov. 23, 1925

INVENTOR
Henry Wochner,
BY Walter N. Haskell.
his ATTORNEY

Sept. 6, 1927. 1,641,243
H. WOCHNER
AXLE GAUGE FOR AUTOMOBILES
Filed Nov. 23, 1925 2 Sheets-Sheet 2
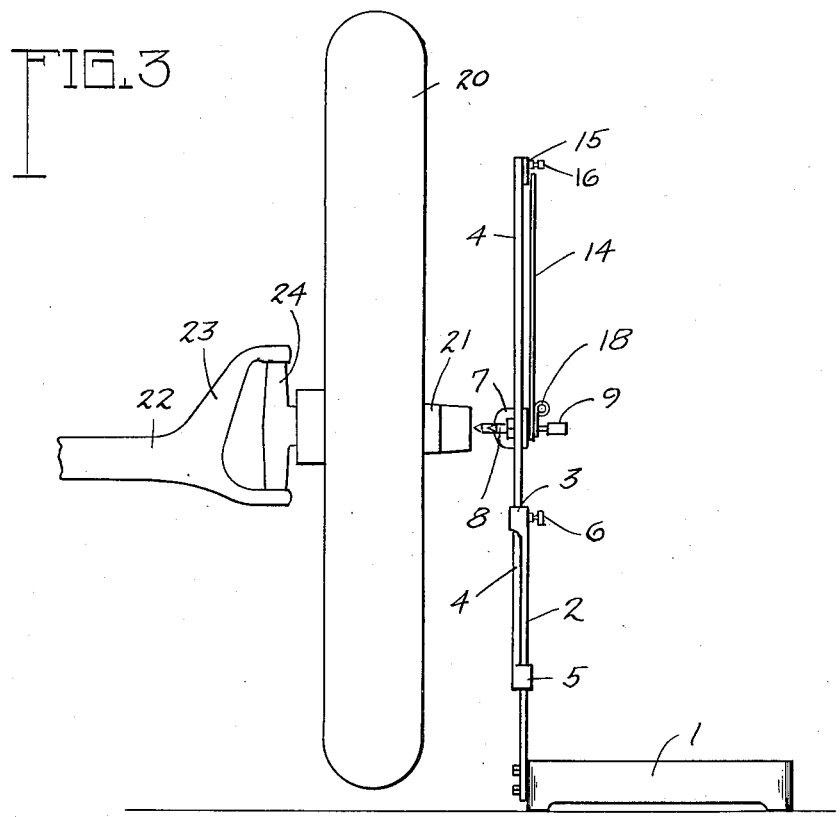
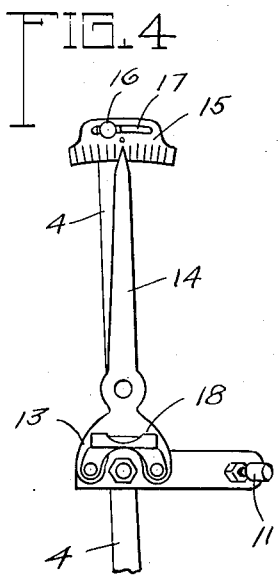
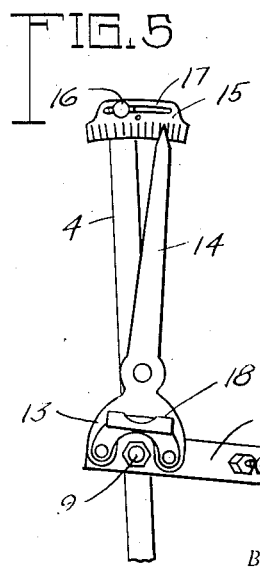
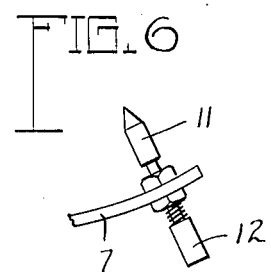
INVENTOR.
Henry Wochner.
BY Walter N. Haskell.
his ATTORNEY.

Patented Sept. 6, 1927.

1,641,243

UNITED STATES PATENT OFFICE.

HENRY WOCHNER, OF ROCK ISLAND, ILLINOIS.

AXLE GAUGE FOR AUTOMOBILES.

Application filed November 23, 1925. Serial No. 70,835.

My invention has reference to an axle gauge for automobiles, and has for its purpose to correct inaccuracies in the positioning of the front axle of a vehicle. These inaccuracies consist chiefly in a twist or bend of the axle, which throws the king-pin out of its true position. This in turn is communicated to the wheel, causing a disagreeable shaking action thereof, commonly known as "shimmying". It is a difficult matter to determine just where the defect is, or to correct the same, by the methods now in use.

The primary object of the invention is to make it possible to take readings at the end of the spindle, with the wheel in two different positions, so as to determine definitely where the trouble is, and the manner in which the same can be corrected.

Another purpose of the invention, which would be used to a large extent on garage floors, is to provide a means for setting the apparatus with reference to the floor on which it stands, so that the same will be in a proper position for making a test. Associated with this means is a scale, or gauge member, capable of being held in adjusted positions, to conform to variations in the setting of the machine.

The above named, and other features and advantages of the invention will more fully appear from the following specification, reference being had to the accompanying drawings, in which:—

Fig. 3 shows the device in side elevation.

Figs. 4 and 5 are details of the indicator mechanism, in different positions.

Fig. 6 is a detail of the push-pin 11, partly extended.

Figure 1:
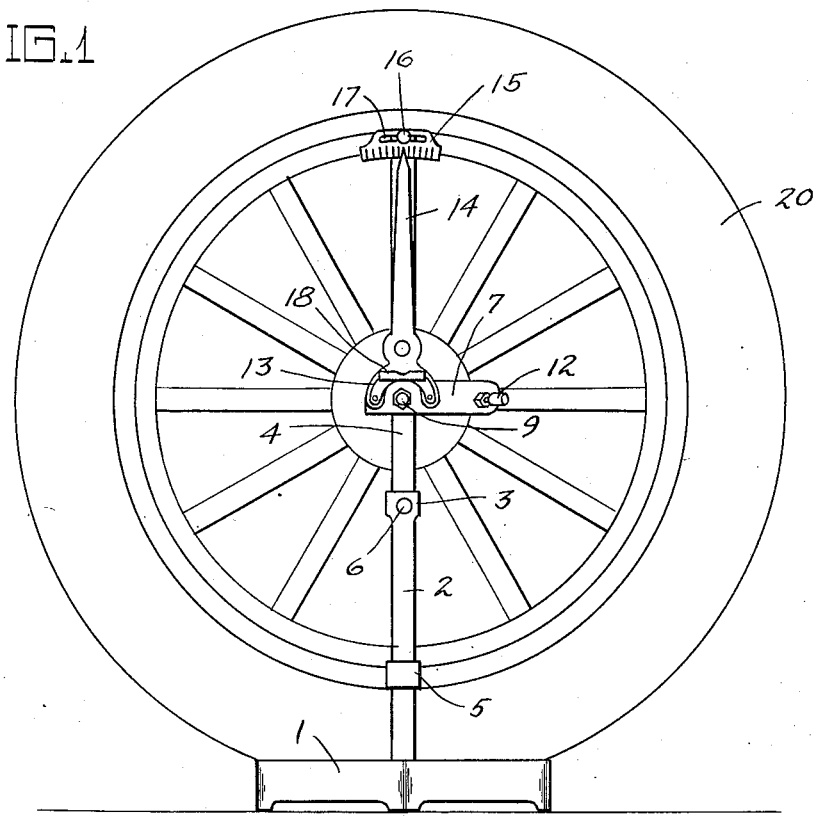
Fig. 1 shows the invention in front elevation, in position when in use.
Figure 2:
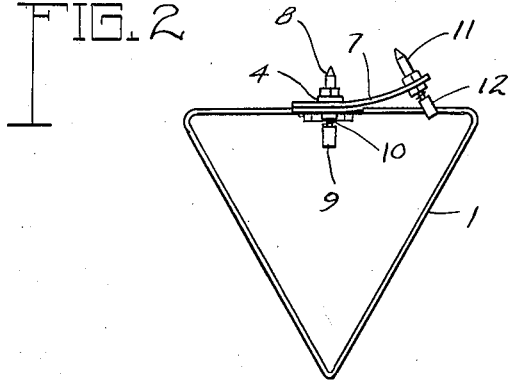
Fig. 2 is a plan view thereof.

The reference number 1 indicates a triangular frame, forming the base of the machine, from one side of which is supported a standard 2, provided at its upper end with a loop 3, in which is slidable a bar 4, provided at its lower end with a loop 5, slidable on the bar 2. A post is thus formed, the parts of which are capable of telescopic action with relation to each other. Said parts are held with the bar 4 in adjusted positions by means of a set-screw 6 in the loop 3, and bearing against the bar 4. By this means the instrument can be set for taking the readings on wheels of different heights, or which may be supported at different heights from the floor.

Pivoted to the bar 4 is an arcuate plate 7, in the pivot of which is a push-pin 8, provided with a handle 9, held normally in a withdrawn position by means of a coiled spring 10, interposed between the handle 9 and bearing for the pin, on the stem of said pin. In the outer end of the plate 7 is a similar push-pin 11, provided with a handle 12, and spring-actuated similarly to the other pin.

Fixed to the outer face of the plate 7 is a forked plate 13, from which an indicator 14 is projected upwardly, the center line of said indicator being in line with the pivot of the plate 7. Secured to the upper end of the bar 4 is a plate 15, by means of a set screw 16, passing through a slot 17 in said plate. Said plate is provided with a scale, to be read in connection with the pointed end of the indicator 14. Fixed to the outer face of the plate 13 is a level 18, provided with the usual glass tube for containing liquid, and bubble therein. Said level is at right angles with the indicator 14, and shows when said indicator is in a perfectly vertical position.

In connection with the device is shown the outline of an automobile wheel 20, and hub 21 thereof, supported from a king-pin 24, pivoted in the fork 23 at the end of an axle shown partially at 22.

For making a test of the condition of the axle said axle is raised so that the wheel 20 is free to be turned upon the king-pin 24, as shown in the drawings. The instrument is then set in front of the wheel and the bar 4 raised until the point of the pin 8 is on a line with the center of the spindle, and in proximity thereto. By pushing the pin in the direction of the wheel the point thereof may be brought in contact with the end of the spindle, so as to exactly locate the same. It will be assumed that the test is being made with the base 1 in a level position, as shown in Fig. 1, with the pointer 14 in a vertical position, and centered on the scale 15. The spindle of the wheel is also approximately in line with the axle. The wheel 20 is then swung forwardly on the king-pin, bringing the end of the spindle into proximity with the pin 11, upon which said pin is pushed in the direction of the wheel, and the point thereof engaged with the center of the spindle. If the movement of the spindle is in a horizontal plane there will be no variation in the heights of the pins 8 and 11, nor in the position of the indicator, but if the second reading is at a point lower than the first, it will be necessary to turn the plate 7 downwardly in order to properly center the pin 11 on the spindle. This will show a forward tilting of the fork 23, caused by a fault either in the fork itself or in the axle. The movement of the plate 7 will cause a variation in the position of the pointer 14, moving the same to the right of a neutral position, as shown in Fig. 5. This variation is noted in the degrees of the scale, and can be used as a basis for making the necessary corrections.

In order that a proper reading may be had it is essential that the points of the pins 8 and 11 shall be in the same horizontal plane at the start of the test. This is accomplished by means of the level 18, Fig. 4 showing the device setting with the bar 4 a little to one side of a plumb position. A perfectly vertical position of the indicator 14 is then secured by means of the level, and the plate 15 shifted to bring the neutral point thereon in line with the pointer, as shown in said Fig. 4. The two readings are then made as before mentioned, any variation being shown by the indicator, as in Fig. 5.

In case of the floor sloping in the other direction, the indicator would be on the other side of the bar 4 from that shown in Fig. 4, and the plate 15 would be moved accordingly. In some cases, also, the fault in the axle might be of such a character as to cause a raising of the plate 7 in the second reading, in which case the end of the indicator would travel on the other side of the neutral point. This would also be the case if the test were being made on the wheel on the opposite side of the car, the wheel shown in the drawings herein being assumed to be on the right hand side of the car.

The device is specially useful for making the corrections mentioned in public garages and repair shops, it is simple in arrangement and operation, and does away with guess-work in determining the cause of the trouble hereinbefore referred to, and in remedying the same.

What I claim, and desire to secure by Letters Patent, is:

1. A device of the class described, comprising a support, a standard thereon, a plate pivoted to said standard, a pair of spaced apart gauge-pins carried by said plate, so as to be normally in a horizontal plane, an indicator carried by said plate, and means on said support cooperating with said indicator to show the relative positions of said plate.

2. A device of the class described, comprising a frame, a support thereon, an arcuate plate pivoted to said support, a pair of spring-actuated push-pins at opposite ends of said plate, one of which is coincident with the pivot of said plate, an indicator connected with said plate, and a scale on said support, for use with said indicator.

3. A device of the class described, comprising a frame, a support thereon, an arcuate plate pivoted to said support at a point intermediate its ends, gauge-pins carried by said plate, one of said pins being coincident with the pivot of said plate, an indicator connected with said plate, a gauge on the end of said support for use with said indicator, and means for showing when said plate is in a horizontal position.

4. A device of the class described, comprising a suitable vertical support, an arcuate plate pivoted thereto, gauge-pins carried by said plate, one of said pins being coincident with the pivot of said plate, a gauge-plate held on said support, so as to be adjustable to one side or other thereof, and an indicator fixed to said first-named plate, and cooperating with said gauge-plate.

5. In a device of the class described, a frame, a standard supported thereby, formed of telescoping parts one of which is movable with relation to the other, and means for holding said parts in adjusted positions, an arcuate plate pivoted to the movable part of said standard, and provided with means for determining the difference between two distinct positions of a vehicle wheel, if any, an indicator carried by said plate, and means on the movable part of the standard cooperating with said indicator to show the degree of such difference.

In testimony whereof I affix my signature.

HENRY WOCHNER.